(No Model.) 6 Sheets—Sheet 1.
D. A. QUIGGIN
MANUFACTURE OF HELICAL COILS OF METALLIC TUBING.
No. 434,804. Patented Aug. 19, 1890.
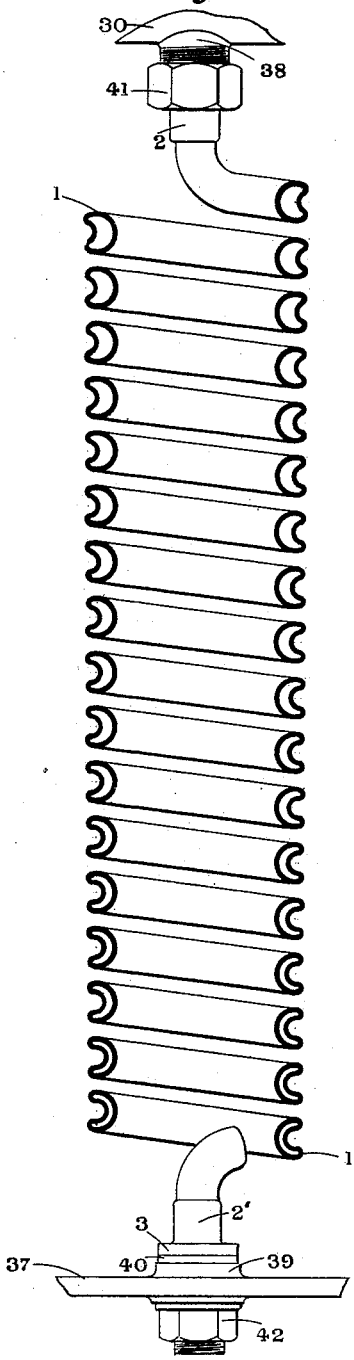
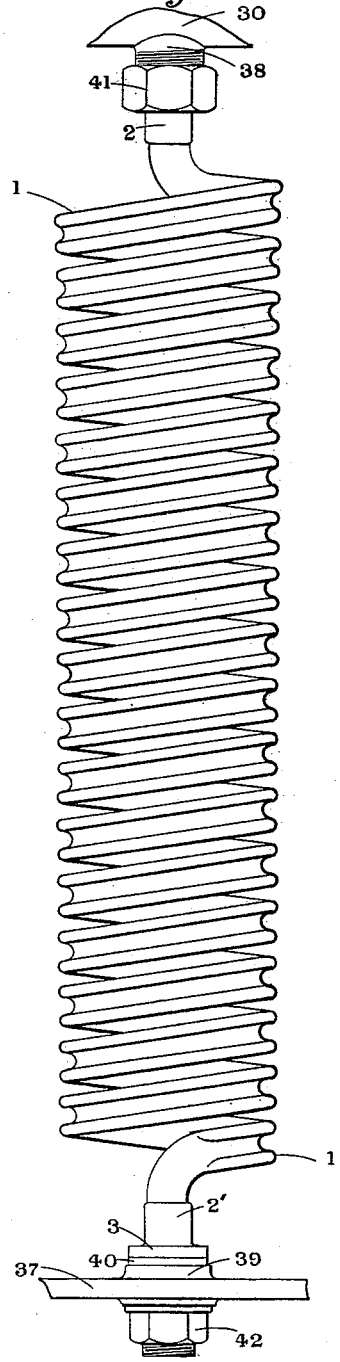

(No Model.) 6 Sheets—Sheet 2.
D. A. QUIGGIN.
MANUFACTURE OF HELICAL COILS OF METALLIC TUBING.
No. 434,804. Patented Aug. 19, 1890.
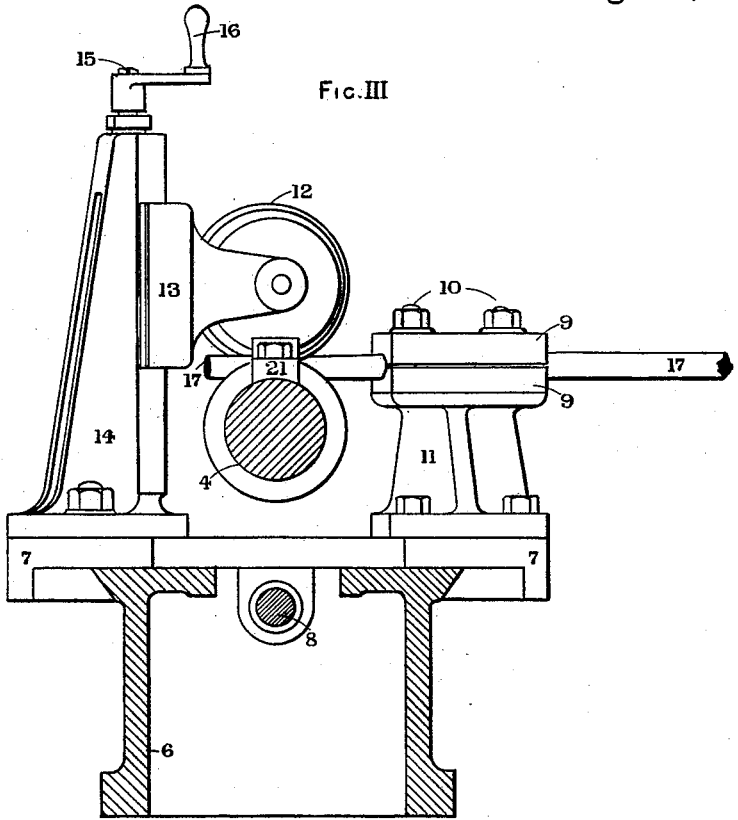
Fig. III
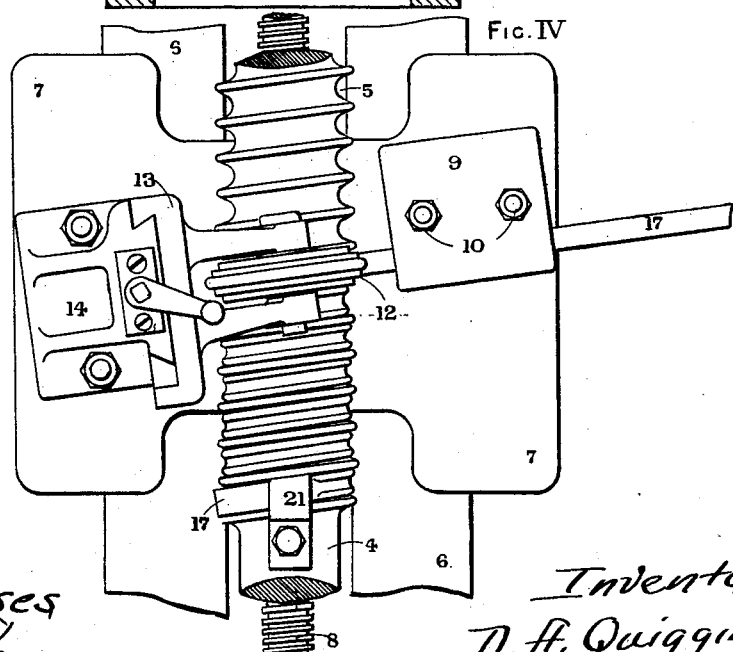
Fig. IV (No Model.) 6 Sheets—Sheet 3.
D. A. QUIGGIN.
MANUFACTURE OF HELICAL COILS OF METALLIC TUBING.
No. 434,804. Patented Aug. 19, 1890.
Fig V
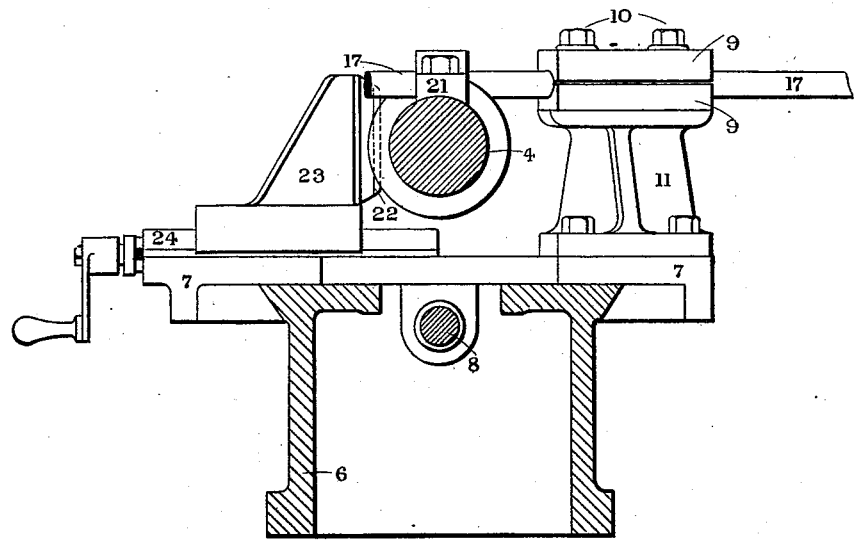
Fig. VI
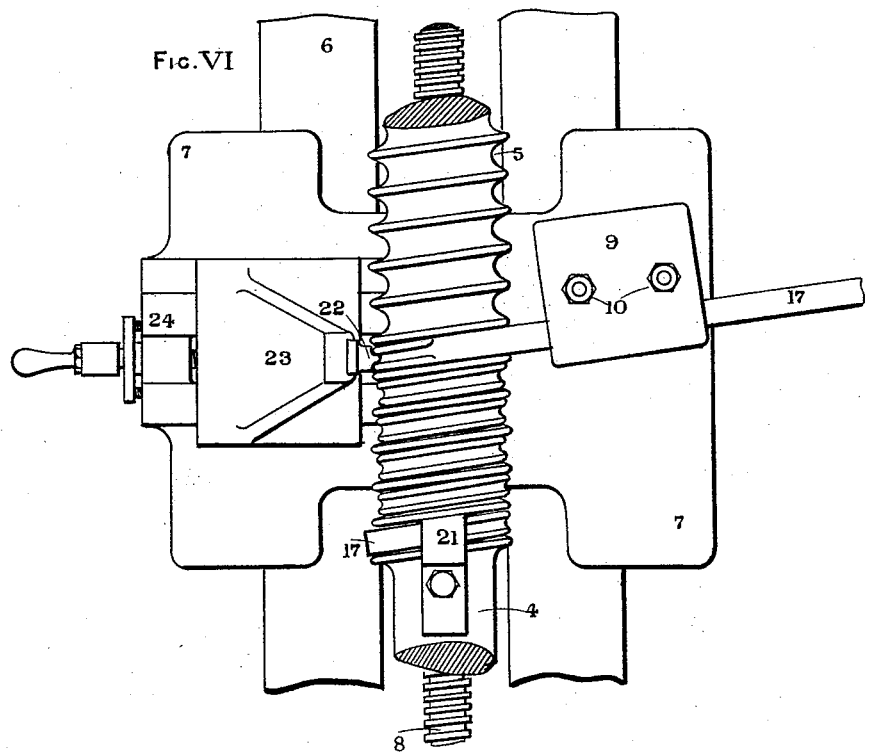
Witnesses
W. P. Keene.
James McShea
Inventor
D. A. Quiggin
by Ellis Spear
Atty.

(No Model.) 6 Sheets—Sheet 4.
D. A. QUIGGIN.
MANUFACTURE OF HELICAL COILS OF METALLIC TUBING.
No. 434,804. Patented Aug. 19, 1890.
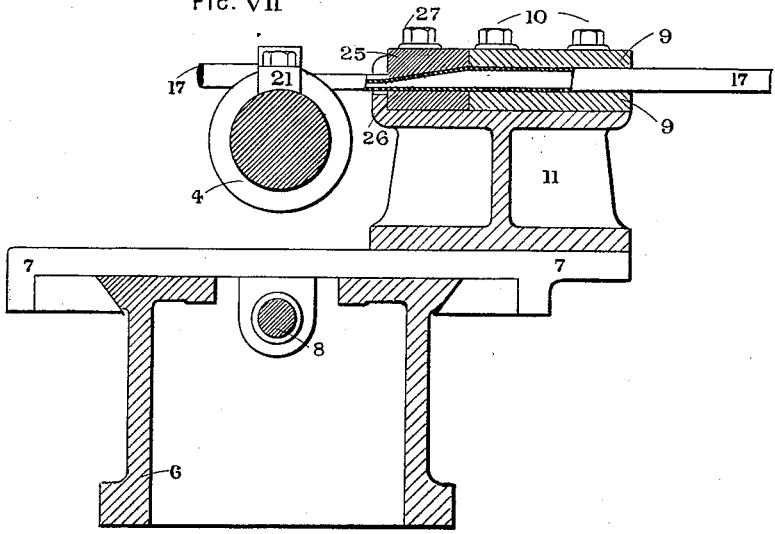
Fig. VII
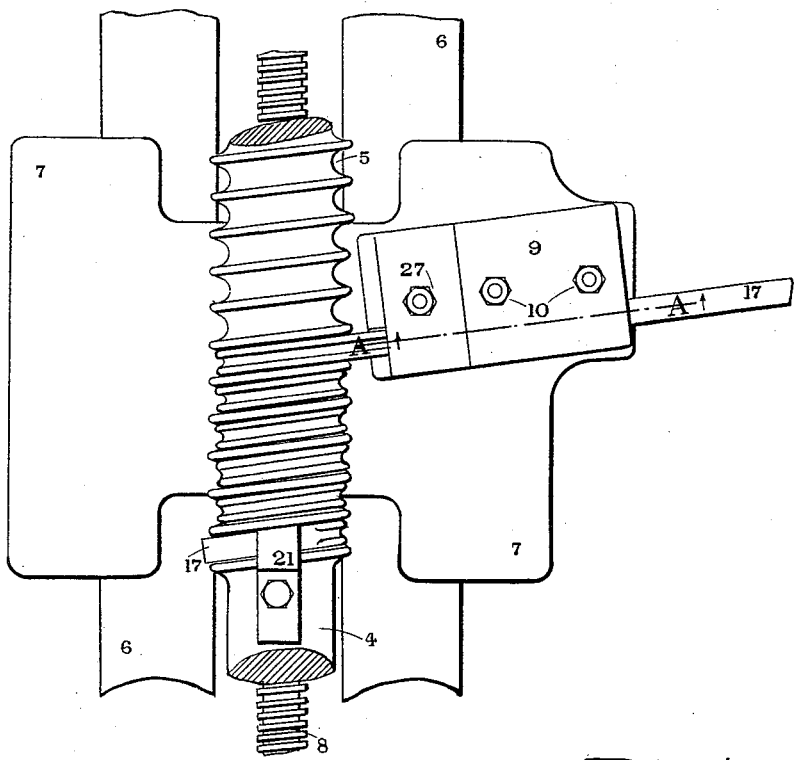
Fig. VIII
Witnesses
W. F. Keene
James M. Shean
Inventor
D. A. Quiggin
By Ellis Spear
Atty.

(No Model.) 6 Sheets—Sheet 5.
D. A. QUIGGIN.
MANUFACTURE OF HELICAL COILS OF METALLIC TUBING.
No. 434,804. Patented Aug. 19, 1890.
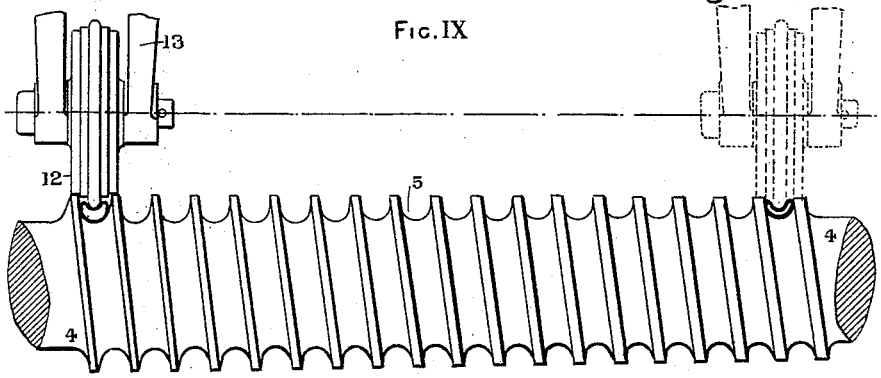
Fig. IX
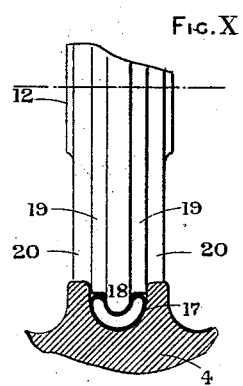
Fig. X
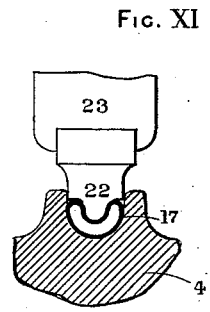
Fig. XI
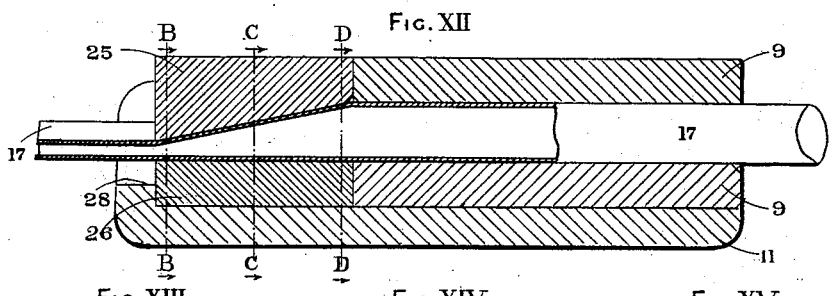
Fig. XII
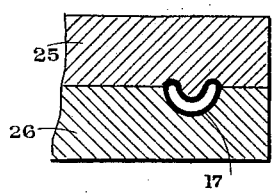
Fig. XIII
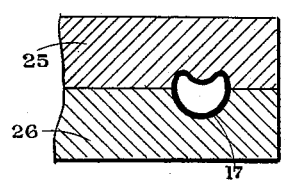
Fig. XIV
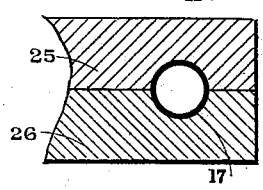
Fig. XV
Witnesses
W. F. Keene.
James M. Shear
Inventor
D. A. Quiggin
by Ellis Spear
Atty.
THE NORRIS PETERS CO., PHOTO-LITHO., WASHINGTON, D. C.

(No Model.) 6 Sheets—Sheet 6.
D. A. QUIGGIN.
MANUFACTURE OF HELICAL COILS OF METALLIC TUBING.
No. 434,804. Patented Aug. 19, 1890.
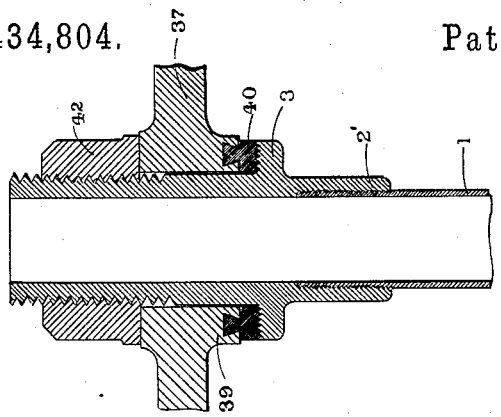
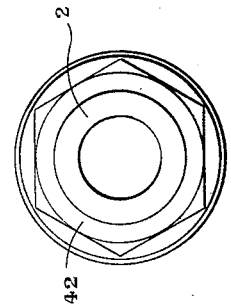
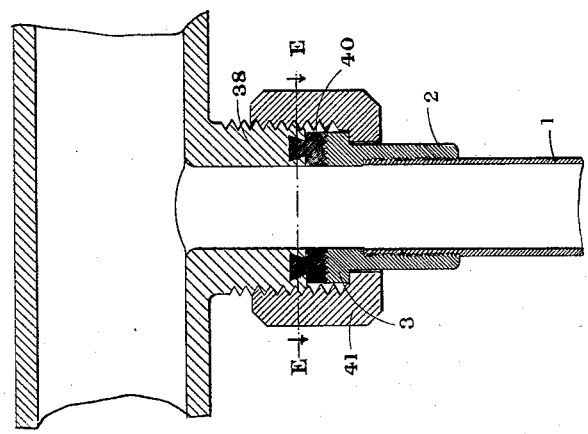
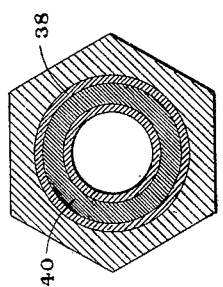
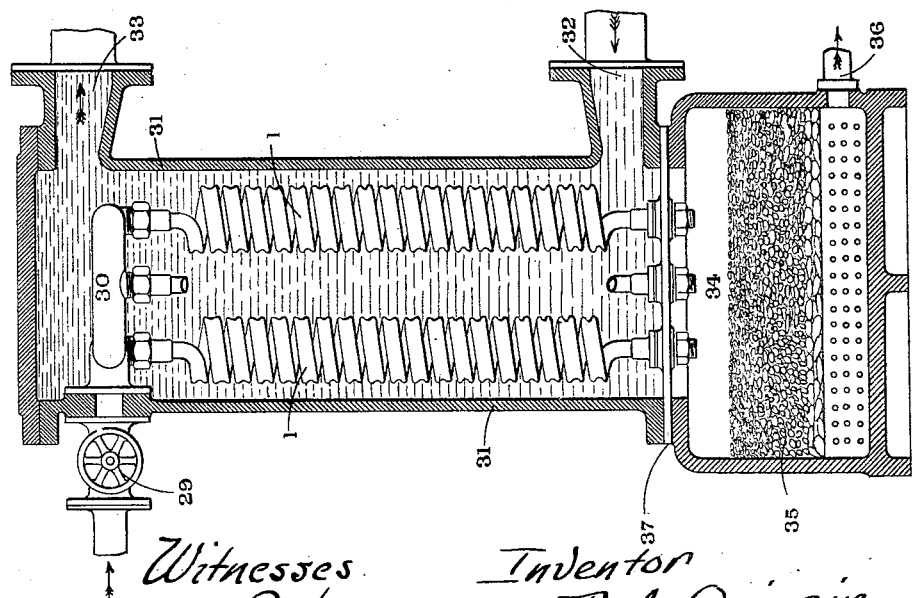
Witnesses
W. P. Keene
James M. Tear
Inventor
D. A. Quiggin
by Ellis Spear
Atty.
THE NORRIS PETERS CO., PHOTO-LITHO., WASHINGTON, D. C.

UNITED STATES PATENT OFFICE.

DANIEL ARTHUR QUIGGIN, OF BLUNDELL SANDS, NEAR LIVERPOOL, ASSIGNOR OF ONE-HALF TO JOHN NEWTON, OF LONDON, ENGLAND.

MANUFACTURE OF HELICAL COILS OF METALLIC TUBING.

SPECIFICATION forming part of Letters Patent No. 434,804, dated August 19, 1890.

Application filed May 1, 1890. Serial No. 350,165. (No model.) Patented in England October 23, 1888, No. 15,229.

*To all whom it may concern:*

Be it known that I, DANIEL ARTHUR QUIGGIN, a subject of the Queen of Great Britain, residing in Blundell Sands, near Liverpool, in the county of Lancaster, England, have invented a certain new and useful Improvement in the Manufacture of Coiled Tubular Heating or Cooling Surfaces, (for which I have obtained a patent in Great Britain, No. 15,229, bearing date October 23, 1888,) of which the following is a specification.

My present invention relates to heat-transmitting surfaces, such as are used in condensers, evaporators, feed-water heaters, and the like. Such surfaces, constructed in accordance with this invention, consist of one or more helical coils of metallic tubing, whose cross-section is crescent-shaped, the horns of the crescent being rounded. The ends of the tubes forming the coils are of circular cross-section and are attached to the diaphragm or inlet-tube of the evaporator or condenser, or the like, as the case may be, in the manner subsequently herein described. I manufacture such helical coils by winding on a suitable grooved mandrel a tube of circular cross-section, and in the process of winding I deform the tube into the required crescent-shaped cross-section by the action of an indenting roller or die of suitable configuration.

In order that my invention may be readily understood, reference is made to the accompanying drawings, which form part of this specification, in which—

Figure I is a sectional elevation, and Fig. II an elevation, of a cylindrical spiral or helical coil constructed according to my present invention. Fig. III is an end elevation, partly in section, of the apparatus for forming the coils. Fig. IV is a plan view of Fig. III. Figs. V and VI are views similar to Figs. III and IV, respectively, of a modification. Fig. VII is a vertical section of still another modification. Fig. VIII is a plan view of said modification. Fig. IX is a detail elevation of the mandrel and the indenting-roller of Figs. III and IV. Fig. X is a detail, enlarged, of the groove in the mandrel 4. Fig. XI is a detail plan view of the mandrel and the indenting-die of Figs. V and VI. Fig. XII is a detail sectional view of the two-part indenting-die of Figs. VII and VIII. Fig. XIII is a section on line B B of Fig. XII. Fig. XIV is a section on line C C of Fig. XII. Fig. XV is a section on line D D of Fig. XII. Fig. XVI shows the coils as applied to a condenser which is represented in vertical section. Fig. XVII shows the manner of attaching the coil to the inlet-pipe 30. Fig. XVIII is a section of the same on line E E of Fig. XVII. Fig. XIX shows the manner of attaching the coil to the diaphragm 37. Fig. XX is a plan view of the same.

Throughout the drawings similar parts are indicated by the same reference-figures, and in the case of sections the direction in which they are viewed is indicated by the arrows placed adjacent to the letters indicating the plane of section.

Fig. I is a section, and Fig. II is an outside view, of the cylindrical spiral coil 1. It will be seen that the ends of the tube forming the coil are of circular cross-section, while the helical portion of the tube has a crescent-shaped section, the horns of the crescent lying on the outside of the coil. This form of coil is specially applicable where the fluid from which heat is to be transmitted is steam. The steam enters the coil at the end where the area of the section is largest, and as it is gradually condensed the area available for its passage gradually diminishes. If preferred, however, the helical portion of the tube may have throughout a uniform crescent-shaped section.

The manner in which the coils are used as heat-transmitting surfaces is illustrated in Fig. XVI, which shows in medial section a condenser such as is used to condense steam to obtain a supply of fresh water. The steam to be condensed enters by the valve 29 and flows by the steam-inlet pipe 30 through the coils 1. The coils are contained in the chamber 31, through which a constant stream of cooling-water is maintained, the water entering by the inlet 32 and leaving by the outlet 33, thus flowing in the opposite direction to the steam in the coils, which is thereby condensed and trickles as fresh water into the filter-chamber 34, and after percolating through the filtering material 35 leaves the condenser by the fresh-water outlet 36.

Referring to Figs. XVII to XX, the ends of the tube forming the coil are screwed, and unions 2 and 2' are screwed and brazed thereon. These unions have a flange 3, the face of which is scored with a number of concentric V-shaped grooves. The face of the nipple 38, in the case of the steam-inlet pipe 30, and of the boss 39, in the case of the diaphragm 37, is grooved, and the section of the groove is made dovetailed by "burring" in the walls, which are thin, the groove is tinned, and a washer 40, of tin or other suitable metal, is cast so as to be permanently attached to the nipple or the boss, as the case may be. This washer 40 is faced, and has a number of grooves similar to those in the collar 3, and so arranged that when the collar 3 is brought up against the washer the ridges of the grooves of the one fit into the depressions of the other. A steam-tight joint is made between these two surfaces, in the case of the steam-inlet pipe, by the nut 41, having an internal collar bearing under the collar 3, the nut screwing on an external thread on the nipple 38, and, in the case of the diaphragm, by the nut 42, which bears on the top side of the boss 39 and screws on the threaded portion of the union 2'. A similar method of attachment of the coils to the pipes or diaphragms may be adopted in the case of evaporators, feed-heaters, and the like.

Figs. III to XV illustrate the method of and the apparatus for the manufacture of the coils. Figs. III and IV show the arrangement usually adopted, and Figs. V, VI, VII, VIII, and IX show modifications, Figs. X to XV being details. I employ a mandrel 4, in which is formed a helical groove 5, the bottom of the groove being a semicircle of the same or nearly the same diameter as the tube to be coiled, and the depth of the groove being greater than the radius of the semicircle. The mandrel is carried in a lathe or other suitable machine in which it can be rotated. In the drawings the mandrel is shown as carried in a lathe. The bed 6, sliding saddle 7, and operating-screw 8 are the only parts which are shown, as the lathe is of the ordinary screw-cutting type. The screw 8 is geared to the lathe-spindle by change-wheels, so that when the mandrel is rotated between the centers of the lathe the saddle 7 traverses a distance equal to the pitch of the groove 5 for each revolution of the mandrel.

On a bracket 11, fixed to the saddle 7, are jaws 9, of wood or other suitable material, tightened by the nuts 10. The end of tube 17 to be coiled is threaded through these jaws 9, and is secured to the groove 5 by the clamp 21. The nuts 10 are screwed down, so as to grip the tube and keep it in tension, and as the coiling proceeds the tube is indented to the desired crescent-shaped cross-section by the indenting-roller 12, which is carried, so that it can rotate freely, by the sliding bracket 13, which can be traversed vertically on the bracket 14 by the feed-screw 15 and handle 16. The bracket 14 is carried from the saddle 7.

Fig. X shows to a larger scale the groove 5 in the mandrel 4, with the tube 17 lying in it and the roller 12 bearing against the tube. As shown, the roller fits laterally within the groove. The central portion 18 of its rim is semicircular, and it has at each side a shoulder 19, which shoulders bear upon the horns of the crescent when the latter is fully formed, and it has also at each side a shoulder 20, which abuts against the top of the ridge upon the mandrel and so limits the distance to which the roller can be fed into the groove. These shoulders 20 may, however, be dispensed with, if desired.

Instead of the indenting-roller 12, an indenting-die 22, or an indenting-die formed in two parts 25 and 26, Figs. VII and VIII, may be substituted.

As shown in Figs. V and VI, the indenting-die 22 is carried on a sliding bracket 23, which can be traversed horizontally on the slide 24. A plan of the die 22, with the tube and groove in position, is shown at Fig. XI.

When it is desired to use a two-part die, the bracket 11 is arranged to carry the die in front of the jaws 9, as shown in Figs. VII and VIII. A section of the die on the line A A of Fig. VIII is shown at Fig. XII, and transverse sections on B B, C C, and D D of Fig. XII, showing the shape of the die, are shown at Figs. XIII, XIV, and XV, respectively. The halves of the die are tightened by the stud and nut 27, and as the die is subjected to a powerful pull by the tube during the coiling I provide a ledge 28 for the die to abut against, the ledge being notched to clear the tube. When it is required that the tube shall have a uniform cross-section when coiled, the indenting-wheel 12, the die 22, or the die 25 26 is at once adjusted to the proper position; but when it is desired that the cross-section shall vary, as shown in Figs. I and II, the dies are adjusted as the coiling proceeds by radially traversing the brackets 13 or 23, or by screwing down the nut 27, as the case may be. When the indenting-roller 12 is used, the necessity for adjusting it as the coiling proceds may be obviated by modifying the mandrel 4, as shown in Fig. IX. The diameter of this mandrel at the bottom of the groove is constant from end to end, but the diameter over the tops of the ridges diminishes from one end to the other. The axis upon which the mandrel rotates—that is to say, the line of centers of the lathe—is inclined to the direction of the motion of the saddle 7, the amount of this inclination being such that if the roller 12 be adjusted to bear against the ridges at one end of the mandrel it will continue to do so as it traverses the length of the mandrel. The position of the roller relatively to the mandrel is shown in full lines for the beginning and in dotted lines for the completion of the coiling process. It is obvious that this kind of mandrel may be used in conjunction with the die 22 instead of with the roller 12.

Where found necessary to more effectually guide the tube into the groove, a guide to embrace the tube may be fixed to the saddle between the jaws and the mandrel, and as close as possible to the latter. The mandrel may have more than one helical groove, so that more than one tube can be operated upon simultaneously, each tube being guided and pressed, as described.

While I have illustrated the application of my improved heating-surfaces to a condenser, it is to be understood that their use is not so limited but that they may be used in any suitable case where heat is to be transmitted from one fluid to another. It is also to be understood that I do not limit myself to the particular methods of attachment shown and described.

Having now fully described my invention, what I claim, and desire to secure by Letters Patent, is—

1. As an improved heat-transmitting surface, a helical coil of metallic tubing, the cross-section of which tubing is crescent-shaped, the horns of the crescent being rounded and lying on the outside of the coil, substantially as described.

2. As an improved heat-transmitting surface, a helical coil of metallic tubing, the cross-section of which tubing is crescent-shaped, the horns of the crescent being rounded and lying on the outside of the coil, said cross-section having a constant perimeter, but the area of same gradually diminishing from one end of the coil to the other, substantially as described.

3. In apparatus for the manufacture of helical coils such as are herein described, the combination of a rotating mandrel having a helical groove in which the tube lies when coiled, with an indenting roller or die which indents the tube as it is being coiled to a crescent-shaped cross-section, and a pair of adjustable jaws through which the tube is drawn before being indented, the indenting roller or die and the jaws being carried on a saddle which slides parallel to the axis of the mandrel, substantially as described.

4. In apparatus for the manufacture of helical coils such as are herein described, the combination of a rotating mandrel having a helical groove in which the tube lies when coiled, with an indenting roller or die adjustable radially relatively to the mandrel and which indents the tube as it is being coiled to a crescent-shaped cross-section, and a pair of adjustable jaws through which the tube is drawn before being indented, the indenting roller or die and the jaws being carried on a saddle which slides parallel to the axis of the mandrel, substantially as described.

5. In apparatus for the manufacture of helical coils such as are herein described, the combination of a rotating mandrel having a helical groove whose depth varies from one end of the mandrel to the other, in which the tube lies when coiled, with an indenting roller or die which indents the tube as it is being coiled to a crescent-shaped cross-section, and a pair of adjustable jaws through which the tube is drawn before being indented, the indenting roller or die and the jaws being carried on a saddle which slides parallel to the axis of the mandrel, substantially as described.

6. In apparatus for the manufacture of helical coils such as are herein described, the combination of the grooved mandrel 4, the indenting-roller 12, carried in the bracket 13, sliding on the bracket 14 and actuated by the feed-screw 15, the jaws 9, carried on the bracket 11 and adjusted by the nuts 10, the saddle 7, and the feed-screw 8, substantially as described.

7. In combination with the coil-pipe end and the diaphragm or adjacent pipe to which said end is to be attached, an interposed washer between the adjacent surfaces, said washer being held within a groove formed in one surface and having on its face one or more concentric grooves, the abutting surface being similarly grooved to interlock with said grooved washer-face, substantially as described.

In testimony whereof I have hereunto set my hand in the presence of two subscribing witnesses.

DANIEL ARTHUR QUIGGIN.

Witnesses:
ROBT. C. SLOAN,
J. E. LLOYD BARNES.